United States Patent
Esna Ashari Esfahani et al.

(10) Patent No.: US 12,087,062 B1
(45) Date of Patent: Sep. 10, 2024

(54) SYSTEM AND METHOD FOR OPTIMIZING SIGN INTERPRETATION

(71) Applicant: GM Global Technology Operations LLC, Detroit, MI (US)

(72) Inventors: Alireza Esna Ashari Esfahani, Novi, MI (US); Indranil Palit, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 14 days.

(21) Appl. No.: 18/295,470

(22) Filed: Apr. 4, 2023

(51) Int. Cl.
| | |
|---|---|
| G06V 20/58 | (2022.01) |
| B60W 30/14 | (2006.01) |
| B60W 30/18 | (2012.01) |
| G06T 7/62 | (2017.01) |
| G06T 7/64 | (2017.01) |
| G06T 7/70 | (2017.01) |

(52) U.S. Cl.
CPC ......... *G06V 20/582* (2022.01); *B60W 30/143* (2013.01); *B60W 30/18163* (2013.01); *G06T 7/62* (2017.01); *G06T 7/64* (2017.01); *G06T 7/70* (2017.01); *G06T 2207/30256* (2013.01)

(58) Field of Classification Search
None
See application file for complete search history.

(56) References Cited

U.S. PATENT DOCUMENTS

| | | | | |
|---|---|---|---|---|
| 2022/0067405 A1* | 3/2022 | Kim | ........................ | G06V 10/82 |
| 2023/0169779 A1* | 6/2023 | Nessler | ................... | G01C 21/30 |
| | | | | 701/409 |

OTHER PUBLICATIONS

Baek, et al., "What Is Wrong With Scene Text Recognition Model Comparisons? Dataset and Model Analysis," 2019 IEEE/CVF International Conference on Computer Vision (ICCV), 2019, pp. 4714-4722, doi: 10.1109/ICCV.2019.00481.

Busta, et al., "Deep TextSpotter: An End-to-End Trainable Scene Text Localization and Recognition Framework," 2017 IEEE International Conference on Computer Vision (ICCV), 2017, pp. 2223-2231, doi: 10.1109/ICCV.2017.242.

Cer, et al., "Universal Sentence Encoder," 2018, arXiv:1803.11175v2 [cs.CL].

Dijkstra, "A Note on Two Problems in Connexion with Graphs," Numer. Math. 1,1959, pp. 269-271, https://doi.org/10.1007/BF01386390.

Dosovigskiy, et al., "CARLA: An Open Urban Driving Simulator," 2017, pp. 1-16, arXiv:1711.03938 [cs.LG].

(Continued)

*Primary Examiner* — Samira Monshi

(74) *Attorney, Agent, or Firm* — Vivacqua Crane, PLLC

(57) ABSTRACT

A method for optimizing sign includes receiving, by a controller of a vehicle, sensor data from a plurality of sensors of the vehicle. The method further includes detecting a sign along a road while the vehicle is in motion using the sensor data and, in response to detecting the sign along the road of the vehicle, determining an optimal location of the vehicle relative to the sign to recognize the sign. Further, the method includes recognizing a content of the sign using an optimal frame captured by the camera at the optimal location and, in response to recognizing the content of the sign, filtering the plurality of frames of the video captured by the camera to minimize a use of a computational resources of the controller.

17 Claims, 3 Drawing Sheets

(56) References Cited

OTHER PUBLICATIONS

Girshick, et al. "Rich Feature Hierarchies for Accurate Object Detection and Semantic Segmentation," 2014 IEEE Conference on Computer Vision and Pattern Recognition, 2014, pp. 580-587, doi: 10.1109/CVPR.2014.81.
Jurafsky, et al., "Speech and Language Processing," An Introduction to Natural Language Processing, Computational Linguistics, and Speech Recognition, 2021, Chapter 6, pp. 102-132.
Liao, et al. "Real-Time Scene Text Detection with Differentiable Binarization" Proceedings of the AAAI Conference on Artificial Intelligence, Apr. 3, 2020, pp. 11474-11481, vol. 34. No. 07.
O'Shea, et al., "An Introduction to Convolutional Neural Networks," 2015, arXiv:1511.08458v2 [cs.NE].
Redmon, et al. "You Only Look Once: Unified, Real-Time Object Detection, "2016 IEEE Conference on Computer Vision and Pattern Recognition (CVPR), 2016, pp. 779-788, doi: 10.1109/CVPR.2016.91.
Schmidhuber, "Deep Learning in Neural Networks: An Overview," Neural Networks, 2015, vol. 61, pp. 85-117.
United States Patent and Trademark Office. U.S. Appl. No. 17/820,317, filed Aug. 17, 2022.
United States Patent and Trademark Office. U.S. Appl. No. 18/184,226, filed Mar. 15, 2023.
Van Der Maaten, et al., "Visualizing Data Using t-SNE,." Journal of Machine Learning Research 9, 2008, pp. 1-26.

\* cited by examiner

SYSTEM AND METHOD FOR OPTIMIZING SIGN INTERPRETATION

INTRODUCTION

The present disclosure relates to a system and method for optimizing sign interpretation.

This introduction generally presents the context of the disclosure. Work of the presently named inventors, to the extent it is described in this introduction, as well as aspects of the description that may not otherwise qualify as prior art at the time of filing, are neither expressly nor impliedly admitted as prior art against this disclosure.

Some vehicles include a traffic sign recognition (TSR) system for detecting and interpreting signs along the road. The TRS system may raise awareness of specific roadway markers to help the vehicle operator.

SUMMARY

The present disclosure describes a method and system for optimizing sign interpretation. In an aspect of the present disclosure, the method for optimizing sign interpretation includes receiving, by a controller of a vehicle, sensor data from a plurality of sensors of the vehicle. The sensors include one or more camera. The sensor data includes a video from the camera. The camera has a field of view that captures an area in front of the vehicle. The video has a plurality of frames. The method further includes detecting a sign along a road of the vehicle while the vehicle is in motion using the sensor data. Also, the method includes, in response to detecting the sign along the road of the vehicle, determining an optimal location of the vehicle relative to the sign to recognize the sign. The frame of the video captured by the camera at the optimal location may be referred to as the optimal frame. The method includes recording the video at the optimal location and recognizing the content of the sign using the video recorded at the optimal location. In other words, the method includes recognizing the contents of the sign using the optimal frame. The optimal location may be referred to as the interpretation location. Further, the method includes, in response to recognizing the content of the sign, filtering images of a plurality of detected signs in the plurality of frames of the video captured the optimal location to minimize a use of a computational resources of the controller. The optimal location is based on a road curvature along the road of the vehicle, the speed of the vehicle, light, weather conditions, heading angle of the vehicle, and the size of the sign. The method described above improves vehicle technology and computer technology by avoiding the unnecessary execution of computationally expensive perception and natural language processing models on the vehicle to interpret signs along the road.

In an aspect of the present disclosure, the method further includes determining a threshold point along the road of the vehicle. The threshold point is a location along the road of the vehicle after which there is the probability of missing a message from the sign.

In an aspect of the present disclosure, the method includes determining a class of the sign using the sensor data, determining a priority of the sign based on the class of the sign; and determining that the priority of the sign is greater than a predetermined priority threshold.

In an aspect of the present disclosure, the method further includes sign recognition at a constant frequency in response to determining that the priority of the sign is less than or equal to the predetermined priority threshold until the confidence level of the results of the sign recognition is greater than a predetermined confidence level. The constant frequency is a function of the speed of the vehicle.

In an aspect of the present disclosure, the method further includes commanding the vehicle to decrease its speed in response to determining that the priority of the sign is greater than the predetermined priority threshold.

In an aspect of the present disclosure, the method further includes commanding the vehicle to change lanes in response to determining that the priority of the sign is greater than the predetermined priority threshold.

Further, the present disclosure describes a tangible, non-transitory, machine-readable medium, including machine-readable instructions, that when executed by a processor, cause the processor to execute the method described above.

Also, the present disclosure describes a vehicle including sensors and a controller in communication with the sensors. The controller is programmed to execute the method described above.

Further areas of applicability of the present disclosure will become apparent from the detailed description provided below. It should be understood that the detailed description and specific examples are intended for purposes of illustration only and are not intended to limit the scope of the disclosure.

The above features and advantages, and other features and advantages, of the presently disclosed system and method are readily apparent from the detailed description, including the claims, and exemplary embodiments when taken in connection with the accompanying drawings.

BRIEF DESCRIPTION OF THE DRAWINGS

The present disclosure will become more fully understood from the detailed description and the accompanying drawings, wherein.

DETAILED DESCRIPTION

Figure 1:
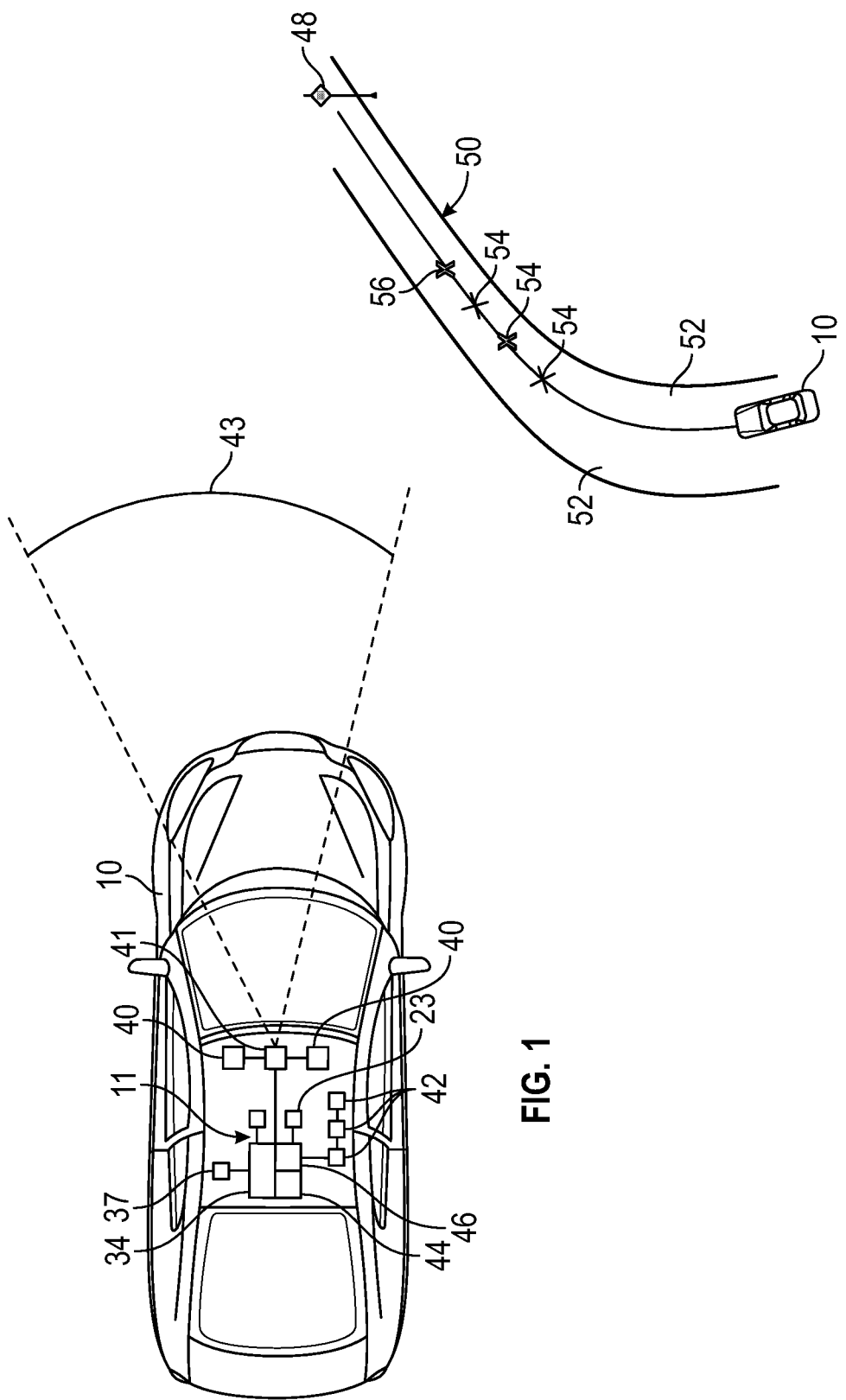
FIG. 1 is a schematic diagram depicting an embodiment of a vehicle including a system for optimizing sign interpretation.

Reference will now be made in detail to several examples of the disclosure that are illustrated in accompanying drawings. Whenever possible, the same or similar reference numerals are used in the drawings and the description to refer to the same or like parts or steps.

With reference to FIG. 1, a vehicle 10 includes (or is in communication with) a system 11 for optimizing sign interpretation. The system 11 may be referred to as a traffic sign recognition (TSR) system. As a non-limiting example, the system 11 may be in wireless communication with the vehicle 10. Although the vehicle 10 is shown as a sedan, it is envisioned that that vehicle 10 may be another type of vehicle, such as a pickup truck, a coupe, a sport utility vehicle (SUVs), a recreational vehicle (RVs), etc.

The vehicle 10 includes a controller 34 and one or more sensors 40 in communication with the controller 34. The sensors 40 collect information and generate sensor data indicative of the collected information. As non-limiting examples, the sensors 40 may include Global Navigation Satellite System (GNSS) transceivers or receivers, yaw rate sensors, speed sensors, lidars, radars, ultrasonic sensors, and one or more cameras 41, among others. The GNSS transceivers or receivers are configured to detect the location of the vehicle 10 in the globe. The speed sensors are configured to detect the speed of the vehicle 10. The yaw rate sensors are configured to determine the heading of the vehicle 10. The cameras 41 may have a field of view 43 large enough to capture images in an area in of the vehicle 10. It is envisioned, however, that the cameras 41 may have a field of view large enough to capture video and/or images of areas in the rear and in the sides of the vehicle 10. The ultrasonic sensor may detect static and/or dynamic objects. At least one of the sensors 40 (e.g., the GNSSS transceiver) is configured to determine the current location of the vehicle 10. The sensor data generated by the sensors 40 may include video from the camera 41. The video may include multiple frames and depict images of an area in front of the vehicle 10. For example, the video may include images depicting a sign 48 along a road 50. The vehicle 10 may be traveling along the road 50, and the road 50 may be curved. The road may have one or more lanes 52.

The controller 34 is in communication with the sensors 40. Accordingly, the controller 34 is programmed to receive sensor data from the sensors 40. The controller 34 includes at least one processor 44 and a non-transitory computer readable storage device or media 46. The processor 44 may be a custom-made processor, a central processing unit (CPU), a graphics processing unit (GPU), an auxiliary processor among several processors associated with the controller 34, a semiconductor-based microprocessor (in the form of a microchip or chip set), a macroprocessor, a combination thereof, or generally a device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media of the controller 34 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the controller 34 in controlling the vehicle 10.

Figure 3:
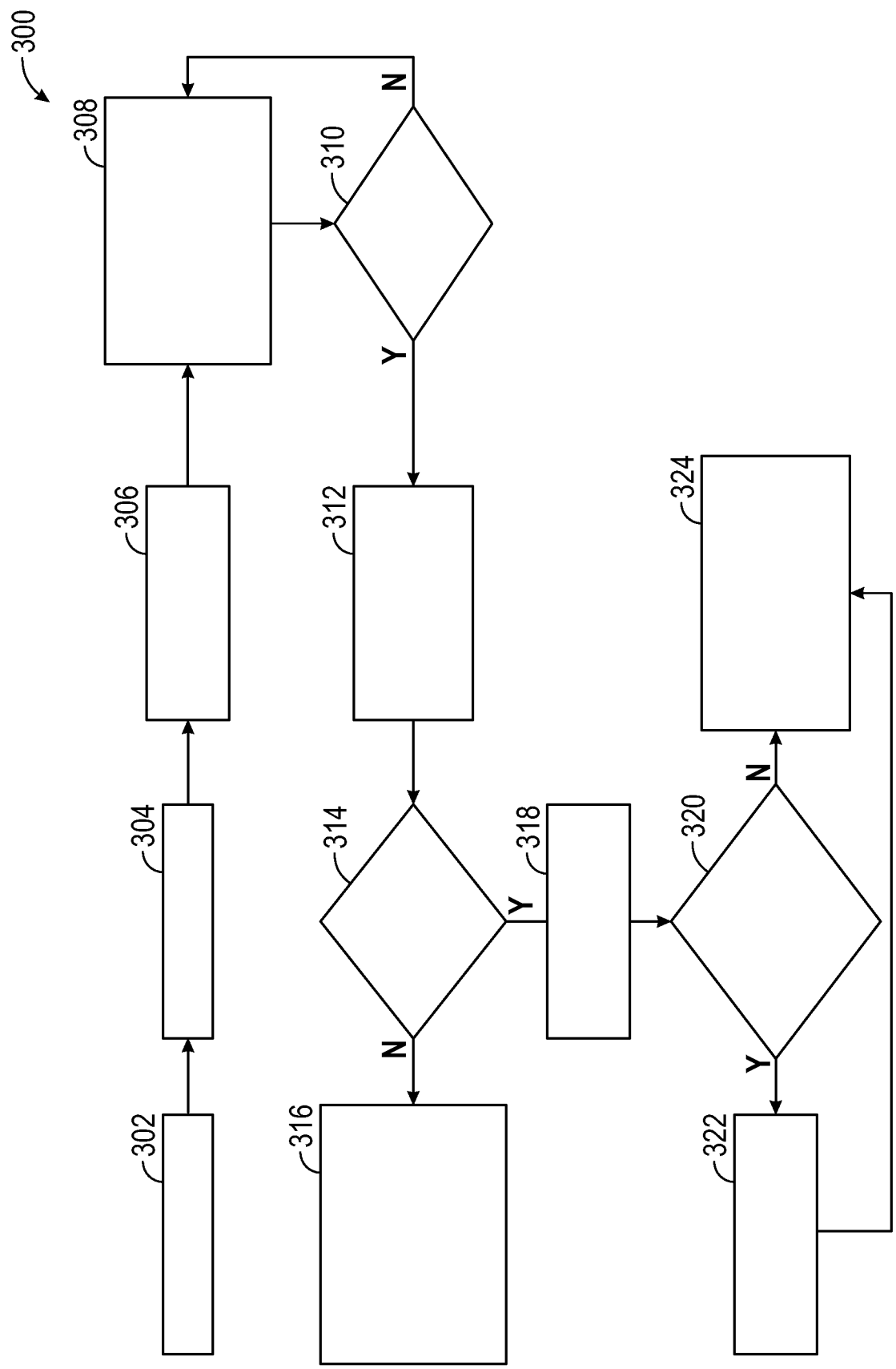
FIG. 3 is a flowchart of a method for optimizing sign interpretation.

The instructions may include one or more separate programs, each of which comprises an ordered listing of executable instructions for implementing logical functions. The instructions, when executed by the processor 44, receive and process signals from the cameras, perform logic, calculations, methods and/or algorithms for automatically controlling the components of the vehicle 10, and generate control signals to the actuators 42 to automatically control the components of the vehicle 10 based on the logic, calculations, methods, and/or algorithms. Although a single controller 34 is shown in FIG. 1, the system 11 may include a plurality of controllers 34 that communicate over a suitable communication medium or a combination of communication mediums and that cooperate to process the sensor signals, perform logic, calculations, methods, and/or algorithms, and generate control signals to automatically control features of the system 11. In various embodiments, one or more instructions of the controller 34 are embodied in the system 11. The non-transitory computer readable storage device or media 46 includes machine-readable instructions (shown, for example, in FIG. 3), that when executed by the one or more processors, cause the processors 44 to execute the method 300 (FIG. 3).

The vehicle 10 includes a user interface 23 in communication with the controller 34. The user interface 23 may be, for example, a touchscreen in the dashboard and may include, but is not limited to, an alarm, such as one or more speakers to provide an audible sound, haptic feedback in a vehicle seat or other object, one or more displays, one or more microphones, one or more lights, and/or other devices suitable to provide a notification to the vehicle user of the vehicle 10. The user interface 23 is in electronic communication with the controller 34 and is configured to receive inputs from a vehicle occupant (e.g., a vehicle driver or a vehicle passenger). For example, the user interface 23 may include a touch screen and/or buttons configured to receive inputs from a vehicle user. Accordingly, the controller 34 is configured to receive inputs from the vehicle occupant via the user interface 23 and to provide an output (i.e., an alert) to the vehicle user.

The vehicle 10 may include one or more communication transceivers 37 in communication with the controller 34. Each of the communication transceivers 37 is configured to wirelessly communicate information to and from other remote entities, such as the remote vehicles, (through "V2V" communication), infrastructure (through "V2I" communication), remote systems at a remote call center (e.g., ON-STAR by GENERAL MOTORS), and/or personal electronic devices, such as a smart phone. The communication transceivers 37 may be configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards. Accordingly, the communication transceivers 37 may include one or more antennas for receiving and/or transmitting signals, such as cooperative sensing messages (CSMs). The communication transceivers 37 may be considered sensors 40 and/or sources of data. The remote vehicles may include one or more communication transceivers 37 as described above with respect to the vehicle 10.

The vehicle 10 includes one or more actuators 42 in communication with the controller 34. Accordingly, the controller 34 may control the operation of the actuators 42. The actuators 42 control one or more vehicle features such as, but not limited to, a fuel injection system, one or more cam phasers, spark plugs, and a camshaft. The vehicle features may further include interior and/or exterior vehicle features such as, but are not limited to, doors, a trunk, and cabin features such as air, music, lighting, etc.

Figure 2:
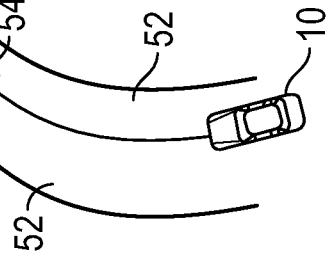
FIG. 2 is a schematic diagram depicting the vehicle of FIG. 1 traveling along a road toward a sign.

With reference to FIGS. 1 and 2, the system 11 is configured to optimize running sign interpretation pipeline and avoid unnecessary execution of computationally expensive perception and natural language processing modules on the vehicle 10. The system 11 may also command the vehicle 10 to change lanes 52 if a sign 48 is highly important to be detected and either the sign 48 is not detected early enough or an occlusion is preventing a successful detection. Sign interpretation methods usually perform heavy computations online on the vehicle 10. For example, some sign interpretation methods execute deep neural networks for object detection, text detection, text extraction, and text interpretation. Therefore, there is a need for identifying the best location to run sign recognition methods.

The system 11 executes a method 300 (FIG. 3) that runs the sign interpretation module on the best frame in terms of sign angle, distance, etc. The system 11 detects the sign 48 along the road 50, predicts the position of the sign 48 in the next frame based on vehicle dynamics and road curvature, and masks the sign 48 after the sign 48 is detected in the next frames to avoid further computations if the predicted sign 48 coordinate substantially overlaps with the detected bounding box.

As discussed in detail below, the system 11 runs the sign interpretation module at the best location (i.e., optimal location 54 or interpretation location) of the vehicle 10 relative to the sign 48 to interpret the contents of the sign 48 based on, among other things, the angle of the sign 48 relative to the vehicle 10, the distance from the vehicle 10 to the sign 48, the road curvature of the road 50 along the route of the vehicle 10, the speed of the vehicle 10, the size of the sign 48, the shape of the sign, lighting conditions, weather conditions, visibility, etc. The system 11 also identifies a threshold point 56 along the route of the vehicle 10. The threshold point 56 is the point after which there is a risk of missing the sign message. The system 11 also predicts and scores optimality of each frame for sign recognition purposes.

Further, the system 11 runs the sign recognition algorithm at the threshold point 56 on optimal frames ranked based on optimality score. The optimal frames are images taken by the camera 41 at the optimal locations 54 of the vehicle 10 relative to the sign 48. The system 11 records the optimal frames of the images taken by the camera 41 at the optimal location 54. If the predicted optimal location 54 doesn't lead to an acceptable detection and text extraction results, it runs the algorithm on previous frames. Simultaneously, it runs the sign interpretation, then system 11 runs sign recognition algorithm on the next frames online periodically based on the predicted importance (i.e., priority) of the sign 48. Accordingly, the system 11 can predict the importance (i.e., priority) of the sign 48. The system 11 also detects the sign 48, predicts the sign position in the next frame based on the current location of the sign 48 on the current frame, vehicle dynamics and road curvature, distance, and camera intrinsic parameters. Also, the system 11 filters out the sign 48 in the next frames after the sign 48 is detected to avoid further computations if the predicted sign coordinate substantially overlaps with the detected bounding box. The system 11 may also command the vehicle 10 to change lanes 52 or reduce speed if necessary for very important signs to detect the message if it is not already detected in a reasonable time period and if the sign 48 is not detected from the saved frames and there is static or dynamic occlusion that prevent the sign detection online.

To determine the threshold point 56, the system 11 may use a look-up table, a neural network, or another suitable process. Regardless of the process used, the threshold point 56 is a function of the distance from the vehicle 10 to the sign 48 while traveling along the road 50, the speed of the vehicle 10 along the road 50, the size (e.g., width, height, etc.) of the sign 48, the topography of the road 50, and the class of the sign 48 (i.e., the sign class). The threshold point 56 is a distance from the sign 48 after which the probability of the sign 48 being undetected is higher than a threshold. The sign class determines the importance (i.e., priority) of the sign 48. For this reason, the system 11 includes a sign classifier to determine the sign class of the sign 48. A priority may be assigned to each sign class. As non-limiting examples, the sign classes may include regulatory, warning, guide, services, construction, recreation, school zone, incident management, and variable sign messages.

As discussed above, the system 11 includes an optimality score calculator to predict and score the optimality of each frame for sign recognition purposes. Not all positions of the vehicle 10 relative to the sign 48 are optimal for recognizing the contents of the sign 48. Road curvature, visibility, weather, among other things, could impact optimality. For this reason, the system 11 calculates the optimality score for each video frame obtained by the camera 41. The optimality score may be a function of the bounding box size (e.g., the width and height of the bounding box), the distance from the vehicle 10 to the sign 48, the angle between the sign 48 and the vehicle heading, among others. Other factors that may impact the optimality score may include, but are not limited to, the visibility (which depends on the weather) and the illumination, which may depend on the time of the day, the date, the latitude, and the longitude. A neural network may be used to determine the optimality score. The optimal score may be the probability that the sign 48 will be detected by the sensors 40.

As an embodiment, the system 11 may use a Mask region-based convolutional neural network (Mask R-CNN) for sign detection and instance segmentation. The Mask R-CNN uses a region proposal network (RPN) approach to generate the candidate bounding boxes around the image of the sign 48 as the vehicle 10 moves toward the sign 48. Once the sign 48 has been detected in an appropriate video frame, for example at the optimal location, the system 11 filters the corresponding bounding boxes of the sign 48 in the next frames to avoid further computations. The system 11 then uses optical character recognition (OCR) and natural language processing (NLP), such as NLP deep learning modules, to interpret the contents of the sign 48.

As discussed above, the system 11 generates bounding boxes around the images of the sign 48 while the vehicle 10 is moving and the camera 41 is taking video. To this end, it is useful to predict the location of the bounding boxes in the future. As stated above, the bounding boxes surround the images of the sign 48. The system 11 may use shallow machine learning methods to determine the future location (i.e., coordinates) of the bounding boxes. The future locations of the bounding boxes may be a function of the heading of the vehicle 10, the speed of the vehicle 10, the current location of the vehicle 10 on the road 50 relative to the sign location, the current location of the bounding box on the frame (i.e., current coordinates of the bounding box), the distance from the vehicle 10 to the sign 48, the road heading of the road 50, and/or the alignment angle. The alignment angle is the difference between the road heading and the vehicle heading.

The system 11 may handle the bounding boxes using the predicted location of the sign 48 and the candidate bounding boxes generated by the RPN. The predicted location of the sign 48 and the candidate bounding boxes may both have rectangular shapes. Accordingly, the predicted location of the sign 48 may be referred to as the predicted location box. If the areas of the predicted location box and the candidate bounding box generated by the RPN overlap by more than a predetermined overlap threshold (e.g., eighty percent) and the difference between the areas of the areas of the predicted location box and the candidate bounding box generated by the RPN is less than a predetermined area threshold, then the system 11 ignores the candidate bounding box generated by the RPN for the precise sign detection, text extraction and text interpretation, but uses the RPN generated bounding box for the next prediction. If the areas of the predicted location box and the candidate bounding box generated by the RPN overlap by less than the predetermined overlap threshold (e.g., forty percent) or the difference between the areas of the areas of the predicted location box and the candidate bounding box generated by the RPN is greater than the predetermined area threshold, then the system 11 keeps the RPN generated bounding box to run the sign interpretation process.

FIG. 3 is a flowchart of a method 300 for optimizing sign interpretation. The method 300 begins at block 302. At block 302, the controller 34 receives sensor data from the sensors 40, including one or more cameras 41. The sensor data includes a video from the camera 41. The camera 41 has a field of view 43 that captures an area in front of the vehicle 10. The video has multiple frames. Using the sensor data, at block 302, the controller 34 detects one or more signs 48 along the road 50 while the vehicle 10 is in motion. The vehicle 10 may be traveling on the road 50. The method 200 then proceeds to block 304.

At block 304, the controller 34 computes the distance from the vehicle 10 to the sign 48, and fetch road topology from maps, so that the controller 34 can compute the threshold point. Then, the method 300 proceeds to block 306.

At block 306, the controller 34 determines the threshold point 56, which is the location of the vehicle 10 relative to the sign 48 after which there is a risk of missing the sign message of the sign 48. To determine the threshold point 56, the system 11 may use a look-up table, a neural network, or another suitable process. Regardless of the process used, the threshold point 56 is a function of the distance from the vehicle 10 to the sign 48, the speed of the vehicle 10, the size (e.g., width, height, etc.) of the sign 48, the topography of the road 50, and the class of the sign 48 (i.e., the sign class). Then, the method 300 proceeds to block 308.

At block 308, when the vehicle 10 is at the threshold point 56, the controller 34 runs the algorithm that manages the execution of the sign interpretation algorithm to recognize the content of the sign 48 (i.e., runs the algorithm discussed below in FIG. 4). The algorithm discussed in FIG. 4 will repeat until it exits. To do the sign interpretation, the controller 34 processes the optimal frame captured by the camera 41 at the optimal location, thereby recognizing the contents of the sign 48. The contents of the sign 48 may include, but are not limited to, text, symbols, and/or shape of the sign 48. As discussed above, the controller 34 may use optical character recognition (OCR) and natural language processing (NLP), such as NLP deep learning modules, to interpret the contents of the sign 48. The managing algorithm in FIG. 4 decides whether or not the sign interpretation algorithm should be executed, or we just need to save image frames. To do so, the algorithm manages several tasks such as measuring current distance to the sign 48, computing optimality score if needed, and masking detected signs if needed. Then, the method 300 continues to block 310.

At block 310, the controller 34 determines if the vehicle 10 has passed the threshold point 56. If the vehicle 10 has not passed the threshold point 56, then the method 300 returns to block 308. If the vehicle 10 has passed the threshold point 56, then the method 300 continues to block 312. The controller 34 executes blocks 312, 314, 316, 318, 320, 322, and 324 only if the confidence level of the sign recognition results is less than a predetermined confidence threshold.

At block 312, the controller 34 predicts the category and importance of the sign 48. To do so, the controller 34 determines the sign class of the sign 48 using the sensor data and/or the contents of the sign 48 determined using sign recognition. Then, the controller 34 assigns a priority to the sign 48 based on its sign class. A priority may be assigned to each sign class. As non-limiting examples, the sign classes may include regulatory, warning, guide, services, construction, recreation, school zone, incident management, and variable sign messages. Then, the method 300 continues to block 314.

At block 314, the controller 34 determines whether the priority is the sign 48 is high. To do so, the controller 34 determines whether the priority of the sign is greater than a predetermined priority threshold. If the priority of the sign is equal to or less than the predetermined priority threshold, then the method 300 continues to block 316. If the priority of the sign 48 is greater than the predetermined priority threshold, then the method 300 continues to block 318.

Figure 4:
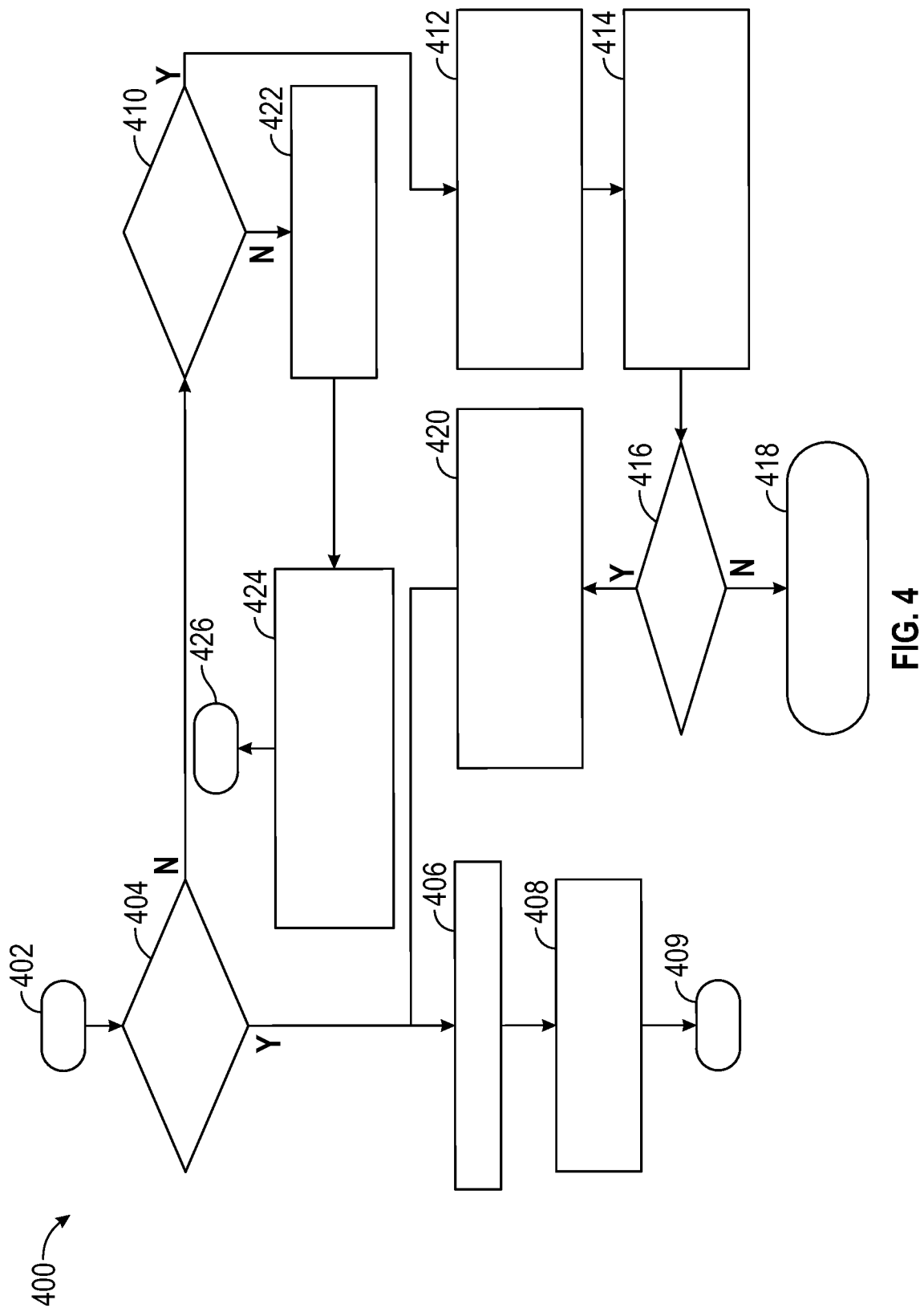
FIG. 4 is a flowchart of a method for managing the execution of sign recognition at each time step for a sign.

At block 316, the controller 34 executes an algorithm to manage sign recognition given in FIG. 4 at a constant frequency until the confidence level of the sign recognition results is greater than the predetermined confidence threshold. The constant frequency is based on the speed of the vehicle 10 and the importance of the sign 48 defined in block 314.

At block 318, the controller 34 evaluates the detection possibility. In other words, the controller 34 determines how difficult it would be to recognize the contents of the sign 48 based on the static or dynamic occlusion of the sign 48. Then, the method 300 proceeds to block 320.

At block 320, the controller 34 determines whether the sign 48 needs special treatment based on the detection possibility and the priority of the sign 48. For example, if it is possible to recognize the contents of the sign 48 and the priority of the sign is greater than the predetermined priority threshold, then the method 300 proceeds to block 322. At block 322, the controller 34 commands the vehicle 10 change lanes 52 and/or reduce its speed. Then, the algorithm proceeds to block 324. If it is not possible to recognize the contents of the sign 48 and/or the priority of the sign is equal to or less than the predetermined priority threshold, then the method 300 proceeds to block 324. At block 324, the controller 34 executes the sign recognition in FIG. 4 at each frame of the video until the confidence of the results of the sign recognition is greater than the predetermined confidence threshold.

FIG. 4 is a flowchart of a method 400 for managing the execution of the sign recognition at each time step for a sign. The method 400 begins at block 402 and is executed at blocks 308, 316, and 324 of the method 300. Then, the method 400 proceeds to block 404. At block 404, the controller 34 determines whether the sign has been recognized. To do so, a flag exists for each sign 48 which shows whether or not each sign is detected. For a new detected sign 48, it is "false". Once we run sign interpretation for a sign 48, the flag may change to "true" based on a confidence level. The controller 34 determines whether the confidence level of the sign recognition results is greater than the predetermined confidence threshold. If the confidence level of the sign recognition results is greater than the predetermined confidence threshold, then the method 400 continues to block 406. At block 406, the controller 34 filters out the image of the sign 48 from the output of the RPN as discussed above. Next, the method 400 continues to block 408. At block 408, the controller 34 predicts the location of the bounding box in the next frame. After block 408, the method 400 proceeds to block 409, where the algorithm ends.

At block 404, if the confidence level of the sign recognition results is equal to or less than the predetermined confidence threshold, then the method 400 continues to block 410. At block 410, the controller 34 determines whether the vehicle 10 is located at a distance from the sign 48 that is less than the threshold point 56. In other words, at block 410, the controller 34 determines whether the vehicle 10 has passed the threshold point 56. If the current vehicle location is after the threshold point, then the method 400 proceeds to block 412.

At block 412, the controller 34 executes sign recognition at the optimal frames based on their ranks if the optimal frames have not been processed yet. As discussed above, the optimal frames are ranked based on optimality score. Then, the method 400 continues to block 414. At block 414, the controller 34 runs the sign interpretation modules with the current images based on the predetermined processing frequency. That means, the controller 34 takes images that are received at current time from the camera 41 (not previously recorded images). Then, the controller 34 considers the predefined frequency and decides if it should run the sign interpretation module or skip running it at current time step. Next, the method 400 continues to block 416.

At block 416, the controller 34 determines whether the sign recognition has been successful. If the sign recognition has not been successful (i.e., the contents of the sign 48 cannot be identified with a certain level of confidence), then the method 400 proceeds to block 418. At block 418, the controller 34 runs sign recognition aggressively as above with respect to blocks 312, 314, 316, 318, 320, 322, and 324 of the method 300. If the sign recognition has been successful (i.e., the contents of the sign 48 can be identified with a certain level of confidence), then the method 400 proceeds to block 420. At block 420, the controller 34 sends a message to the vehicle planner indicating that the sign 48 has been recognized together with the interpretation of the sign 48 obtained from the sign interpretation module. After block 420, the method 400 continues to block 406 as discussed above.

At block 410, if the vehicle 10 has not passed the threshold point 56, then the method 400 proceeds to block 422. At block 422, the controller 34 evaluates the optimality on each single waypoint when the vehicle 10 arrives there to determine one or more optimal locations (i.e., the interpretation locations) of the vehicle 10 relative to the sign 48 to recognize the contents of the sign 48. In other words, the controller 34 determines the optimality score of the current location of the vehicle 10. The optimal location is a waypoint on the path to the sign 48, which is the best location to execute sign recognition in order to interpret the contents of the sign 48. As discussed above, the controller 34 may determine the optimality score at each location based on, among other things, the distance from the vehicle 10 to the sign 48 at each time step, the heading of the vehicle 10 at each time step, the speed of the vehicle 10 at each time step, the alignment angle (i.e., the angular difference between the road heading and the vehicle heading) at each time step, the width of the bounding box at each time step, the height of the bounding box at each time step, the camera parameters, the road topography of the road 50 (e.g., road curvature), the size of the sign 48, light, and weather condition. A prediction model may use the road topography to predict the detection score. Detection scores above a certain threshold are called optimal. The controller 34 may record the frames captured by the camera 41 at each optimal location 54 before the threshold point 56. At block 422, the controller 34 determines optimality score of the frame taken by the camera 41 at the current vehicle location as discussed above. Then, the method 400 continues to block 424.

At block 424, the controller 34 discards poorly scored frames. In other words, the controller 34 discards frames that have an optimality score that is less than a predetermined optimality threshold. For frames that have an optimality score that is equal to or greater than the predetermined optimality threshold, the controller 34 saves and ranks those frames. Then, the method 400 continues to block 426, where the algorithm ends.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the presently disclosed system and method that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

The drawings are in simplified form and are not to precise scale. For purposes of convenience and clarity only, directional terms such as top, bottom, left, right, up, over, above, below, beneath, rear, and front, may be used with respect to the drawings. These and similar directional terms are not to be construed to limit the scope of the disclosure in any manner.

Embodiments of the present disclosure are described herein. It is to be understood, however, that the disclosed embodiments are merely examples and other embodiments can take various and alternative forms. The figures are not necessarily to scale; some features could be exaggerated or minimized to display details of particular components. Therefore, specific structural and functional details disclosed herein are not to be interpreted as limiting, but merely as a representative basis for teaching one skilled in the art to variously employ the presently disclosed system and method. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Embodiments of the present disclosure may be described herein in terms of functional and/or logical block components and various processing steps. It should be appreciated that such block components may be realized by a number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with a number of systems, and that the systems described herein are merely exemplary embodiments of the present disclosure.

For the sake of brevity, techniques related to signal processing, data fusion, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that alternative or additional functional relationships or physical connections may be present in an embodiment of the present disclosure.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A method for optimizing sign interpretation, comprising:
    receiving, by a controller of a vehicle, sensor data from a plurality of sensors of the vehicle, wherein the plurality of sensors includes a camera, and the sensor data incudes a video from the camera, and the camera has a field of view that captures an area in front of the vehicle, and the video has a plurality of frames;
    detecting a sign along a road while the vehicle is in motion using the sensor data;
    in response to detecting the sign along the road of the vehicle, determining an optimal location of the vehicle relative to the sign to recognize the sign, wherein the plurality of frames includes an optimal frame, and the optimal frame is captured by the camera at the optimal location, and the optimal location is based on a road curvature along the road of the vehicle, a speed of the vehicle, and a size of the sign;
    recognizing a content of the sign using the optimal frame captured by the camera at the optimal location; and
    in response to recognizing the content of the sign, filtering images of a plurality of detected signs in the plurality of frames of the video captured by the camera to minimize a use of a computational resources of the controller.

2. The method of claim 1, further comprising determining a threshold point along the road of the vehicle, wherein the threshold point is a location along the road of the vehicle after which there is a probability of missing a message from the sign.

3. The method of claim 2, further comprising:
    determining a sign class of the sign using the sensor data;
    determining a priority of the sign based on the sign class of the sign; and
    determining that the priority of the sign is greater than a predetermined priority threshold.

4. The method of claim 3, further comprising executing sign recognition at a constant frequency in response to determining that the priority of the sign is less than or equal to the predetermined priority threshold until a confidence level of results of the sign recognition is greater than a predetermined confidence level, and the constant frequency is a function of the speed of the vehicle.

5. The method of claim 3, further comprising commanding the vehicle to decrease the speed in response to determining that the priority of the sign is greater than the predetermined priority threshold.

6. The method of claim 5, further comprising commanding the vehicle to change lanes in response to determining that the priority of the sign is greater than the predetermined priority threshold.

7. A tangible, non-transitory, machine-readable medium, comprising machine-readable instructions, that when executed by a processor, cause the processor to:
    receive sensor data from a plurality of sensors of a vehicle, wherein the plurality of sensors includes a camera, and the sensor data incudes a video from the camera, and the camera has a field of view that captures an area in front of the vehicle, and the video has a plurality of frames;
    detect a sign along a road while the vehicle is in motion using the sensor data;
    in response to detecting the sign along the road of the vehicle, determine an optimal location of the vehicle relative to the sign to recognize the sign, wherein the plurality of frames includes an optimal frame, and the optimal frame is captured by the camera at the optimal location, and the optimal location is based on a road curvature along the road of the vehicle, a speed of the vehicle, and a size of the sign;
    recognize a content of the sign using the optimal frame captured by the camera at the optimal location; and
    in response to recognizing the content of the sign, filter the plurality of frames of the video captured by the camera to minimize a use of a computational resources.

8. The tangible, non-transitory, machine-readable medium of claim 7, wherein the tangible, non-transitory, machine-readable medium, further comprising machine-readable instructions, that when executed by the processor, causes the processor to:
    determine a threshold point along the road of the vehicle, wherein the threshold point is a location along the road of the vehicle after which there is a probability of missing a message of the sign.

9. The tangible, non-transitory, machine-readable medium of claim 8, wherein the tangible, non-transitory, machine-readable medium, further comprising machine-readable instructions, that when executed by the processor, causes the processor to:
    determining a sign class of the sign using the sensor data;
    determining a priority of the sign based on the sign class of the sign; and
    determining that the priority of the sign is greater than a predetermined priority threshold.

10. The tangible, non-transitory, machine-readable medium of claim 9, wherein the tangible, non-transitory, machine-readable medium, further comprising machine-readable instructions, that when executed by the processor, causes the processor to:
    execute sign recognition at a constant frequency in response to determining that the priority of the sign is less than or equal to the predetermined priority threshold until a confidence level of results of the sign recognition is greater than a predetermined confidence level, and the constant frequency is a function of the speed of the vehicle.

11. The tangible, non-transitory, machine-readable medium of claim 9, wherein the tangible, non-transitory, machine-readable medium, further comprising machine-readable instructions, that when executed by the processor, causes the processor to:

command the vehicle to decrease the speed in response to determining that the priority of the sign is greater than the predetermined priority threshold.

12. The tangible, non-transitory, machine-readable medium of claim 8, wherein the tangible, non-transitory, machine-readable medium, further comprising machine-readable instructions, that when executed by the processor, causes the processor to:

command the vehicle to change lanes in response to determining that a priority of the sign is greater than a predetermined priority threshold.

13. A vehicle, comprising:

a plurality of sensors;

a controller in communication with the plurality of sensors, wherein the controller is programmed to:

receive sensor data from the plurality of sensors, wherein the plurality of sensors includes a camera, and the sensor data incudes a video from the camera, and the camera has a field of view that captures an area in front of the vehicle, and the video has a plurality of frames;

detect a sign along a road while the vehicle is in motion using the sensor data;

in response to detecting the sign along the road of the vehicle, determine an optimal location of the vehicle relative to the sign to recognize the sign, wherein the plurality of frames includes an optimal frame, and the optimal frame is captured by the camera at the optimal location, and the optimal location is based on a road curvature along the road of the vehicle, a speed of the vehicle, and a size of the sign;

recognize a content of the sign using the optimal frame captured by the camera at the optimal location; and in response to recognizing the content of the sign, filter the plurality of frames of the video captured by the camera to minimize a use of a computational resources of the controller.

14. The vehicle of claim 13, wherein the controller is programmed to determine a threshold point along the road of the vehicle, wherein the threshold point is a location along the road of the vehicle after which there is a probability of missing a message of the sign.

15. The vehicle of claim 14, wherein the controller is programed to:

determining a sign class of the sign using the sensor data;

determining a priority of the sign based on the sign class of the sign; and determining that the priority of the sign is greater than a predetermined priority threshold.

16. The vehicle of claim 15, wherein the controller is programmed to:

execute sign recognition at a constant frequency in response to determining that the priority of the sign is less than or equal to the predetermined priority threshold until a confidence level of results of the sign recognition is greater than a predetermined confidence level, and the constant frequency is a function of a speed of the vehicle.

17. The vehicle of claim 15, wherein the controller is programmed to:

command the vehicle to decrease a speed in response to determining that the priority of the sign is greater than the predetermined priority threshold.

* * * * *